United States Patent Office 3,462,468
Patented Aug. 19, 1969

3,462,468
RESORCINOL ESTERS OF α,α-DIMETHYL
ALIPHATIC ACIDS
Wallace Edmondson Taylor and Enrique Roberto Witt,
Corpus Christi, Tex., assignors to Celanese Corporation,
New York, N.Y., a corporation of Delaware
No Drawing. Continuation-in-part of application Ser. No.
174,378, Feb. 20, 1962. This application Oct. 22, 1964,
Ser. No. 405,821
Int. Cl. C07c 69/00, 69/30
U.S. Cl. 260—410.5
7 Claims

ABSTRACT OF THE DISCLOSURE

This invention relates to novel esters of various hydroxy aromatic compounds, e.g. dihydric and trihydric phenols, and various monocarboxylic and dicarboxylic acids useful as high temperature lubricants.

---

This application is a continuation-in-part of application Ser. No. 174,378, filed Feb. 20, 1962, and now abandoned.

Esters in accordance with this invention have utility as lubricants particularly suited to use at extremely high temperatures such as are encountered in gas turbine engine operation.

As used herein, the prefix "neo" is defined as meaning an α,α-dimethyl substituted compound.

Esters according to this invention correspond to one of the following structural formulas $$\underset{B}{\overset{\underset{\|}{O}}{C}}-O-P-O-\overset{\underset{\|}{O}}{C}-A$$

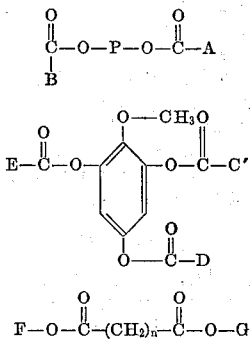

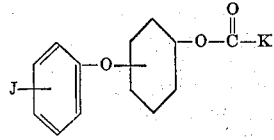

or

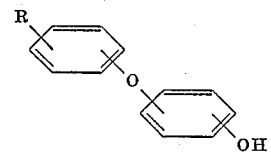

where P is a radical selected from the group consisting of phenylene, diphenylene and diphenylene ether; A and B are each a neoalkyl group; C', D and E are each selected from the group consisting of methyl and phenyl; $n$ is an integer from 4–8; F and G are alkylphenyl group, with alkyl groups containing 1–9 carbon atoms; and J and K are alkyl groups having 8–9 carbon atoms.

It should be understood that this specification will concern itself only with the ester functional (hydroxy or carboxy) cites of the various exemplary compounds set forth herein. It is of course intended to include in this specification and claims the myriad non-ester functional substituted compounds derived from those compounds set forth herein.

It is within the scope of this invention to provide diesters or triesters of aromatic polyhydroxy compounds where the acid moiety is either the same or different in each ester linkage. For example, this invention includes compounds such as resorcinol dineoheptanoate. Further, where the acid moiety is a dicarboxylic acid and the hydroxyl moiety is polyhydroxy, this invention includes polyesters and it also includes diesters of carboxylic acids which are not polymerized.

More specifically, this invention includes diesters wherein the hydroxyl-containing reactant is a hydroquinone, a catechol, a resorcinol, a bisphenol, a dihydroxynaphthol, or substitution products thereof such as, for example, 2,5 di-tert-butyl hydroquinone, diphenyl dimethyl methane (bisphenol A), 3,4' dihydroxyphenyl ether, and di (4-hydroxy) phenyl ether. This invention even includes such alcohols as trimethylol anisole and esters thereof even though these compounds are not as thermally stable as other compounds included herein.

Diesters according to this invention suitably use, as the acid moiety reactant, such acids as pivalic acid, heptanoic acid, dimethylmalonic acid, adipic acid, succinic acid, azelaic acid, sebacic acid, neo-heptanoic acid, neodecanoic acid, neotridecanoic acid, benzoic acid, the acid halide corresponding to these acids, or the anhydride of these acids where applicable.

It is preferred to utilize a mole ratio of monoacid moieties to alcoholic moieties of at least slightly higher than 1 in order to insure the full esterification of both phenolic hydroxyl groups. It is further preferred that both phenolic hydroxyl groups be esterified with the same acid moiety.

This invention also includes esters wherein the hydroxyl-containing reactant is a monohydric compound such as phenol, xylenol, and substitution products thereof. More specifically, substituted monohydric arylols according to this invention include compounds corresponding to the structural formula— where R is an alkyl radical as for example p-tert-butyl, m-tert-butyl, p-tert-pentyl, m-tert-pentyl or 1,1,3,3 tetra methyl butyl.

Esters according to this invention can sometimes be made by direct reaction between the carboxylic acid and hydroxyl moieties set forth above. Preferably, acid anhydrides are reacted with alcohols to produce appropriate esters and optimumly the hydroxyl moiety is reacted with acid halides, for example, the chloride or bromide, to form the ester.

It is possible to make esters according to this invention by the reactions set forth above without the aid of a catalyst. It is preferred, however, to utilize a catalyst, such as dimethylformamide, magnesium chloride or pyridine, for example, in order to increase the efficiency of the esterification reaction and to speed it to completion.

The esterification reaction according to this invention is preferably, though not necessarily, carried out by refluxing a solution of the reactants and the catalyst system in an inert non-olefinic solvent such as toluene or benzene for example.

The reaction temperature will, of course, depend upon the particular reactants involved but, in general, the reaction temperatures range from about 0 to 130° C. It is, of course, desirable to maintain the reaction for a time sufficient to insure the reaction of all the available reactants. Where the reaction involves an acid chloride moiety, the reaction is substantially complete when hydrogen chloride gas ceases to be evolved. Where the reaction is direct esterification, the cessation of water evolution signifies that the reaction is substantially complete.

The reaction product is conveniently purified by washing with dilute acid, dilute caustic and neutral water and then striping off the solvent by flash or vacuum distillation. If necessary or desired, the resulting product can be decolorized, e.g., with charcoal, and then filtered. Esterification yields are quite good, often at least about 75% of theoretical based upon the amount of hydroxyl moiety charged. Yields as high as 95% of theoretical are not unusual in the reactions of this invention.

The following specific examples serve to further illustrate but not limit the instant invention.

Example I

Resorcinyl dipivalate was prepared by mixing together 79 parts by weight (0.72 mole) of resorcinol, 200 parts by weight of toluene solvent, and 10 parts by weight of dimethylformamide catalyst. Pivaloyl chloride was added to this mixture very slowly, 200 parts by weight (1.65 moles) in thirty minutes, and the reactants were refluxed until hydrogen chloride ceased to be evolved. After reflux, the reaction product was cooled, washed with a 1 N aqueous sodium hydroxide solution, a 1 N hydrochloric acid solution and water; the toluene was removed by vacuum flashing at 100° C. and 1 to 5 mm. Hg absolute; the water was decanted; the hot ester product was decolorized with carbon, filtered, and then flashed to evolve 159 parts by weight of product which was a white crystalline material. The yield was 79% based upon the amount of resorcinol charged to the reaction.

Example II

Resorcinol diheptanoate was prepared by mixing together 165 parts by weight (1.5 moles) of resorcinol, 454 parts by weight of toluene solvent and 23.6 parts by weight of dimethyl formamide catalyst. Heptanoyl chloride was added to this mixture very slowly, 500 parts by weight (3.3 moles) in one hour at 55 to 60° C. and the reactants were refluxed until hydrogen chloride ceased to be evolved. After reflux the reaction product was cooled, washed 5 times with a 1 N sodium hydroxide aqueous solution, once with 1 N hydrochloric acid solution and twice with water; the toluene and water were removed by vacuum flashing at 100° C. and 1 to 5 mm. Hg absolute; the hot ester product was decolorized with carbon, filtered, and then flash-distilled at 205 to 215° C. and 2 mm. Hg absolute to evolve 438 parts by weight of product which was a colorless fluid having a boiling point of 205–215° C. at 2 mm. Hg absolute. The yield was 80% based upon the amount of resorcinol charged to the reaction.

Example III

Hydroquinone diheptanoate was prepared by mixing together 165 parts by weight of hydroquinone, 454 parts by weight of toluene solvent and 23.6 parts by weight of dimethyl formamide catalyst. Heptanoyl chloride was aded to this mixture very slowly, 500 parts by weight (3.3 moles) in 1 hour at 70° C. and the reactants were refluxed until hydrogen chloride ceased to be evolved. After reflux, the reaction product was cooled, washed with a 1 N sodium hydroxide aqueous solution, a 1 N hydrochloric acid solution and water; the toluene and water were removed by vacuum flashing at 100° C. and 1 to 5 mm. Hg absolute; the hot ester product was decolorized with carbon, filtered, and then flash-distilled to evolve 454 parts by weight of crude product which was then purified by recrystallization from n-heptane. The yield was 91% based upon the amount of hydroquinone charged.

Example IV

Bisphenol A (diphenol, dimethyl methane) diheptanoate was prepared by azeotroping 342 parts by weight (1.5 moles) of bisphenol A with 440 parts by weight of benzene at 65 to 80° C. until no more water was removed. The thus dried mixture was cooled and 14.2 parts by weight of dimethylformamide was added thereto followed by the slow addition (1 hour) of 490 parts by weight (3.3 moles) of heptanoyl chloride. The reactants were refluxed for 2 hours at 120° C. and the resultant product was stripped of volatiles by heating to 290° C. at 4 mm. Hg absolute until volatiles ceased to be collected. The residue of the volatile stripping step was washed 5 times with 1 N sodium hydroxide aqueous solution at 40 to 60° C.; water-washed to neutrality; dehydrated in vacuo; decolorized with charcoal; and filtered to evolve 598 parts by weight of product which was a slowly crystallizing yellowish oil. The yield was 90% based upon the amount of bisphenol A charged.

Example V

Resorcinol dineoheptanoate was prepared by mixing 165 parts by weight of resorcinol (1.5 moles), 400 parts by weight of toluene solvent and 14.2 parts by weight of dimethylformamide catalyst. Neoheptanoyl chloride was slowly added to this mixture, 500 parts by weight (3.4 moles) in 2 hours at 70° C. The reactants were heated to 100° C. for 2 hours, cooled to 40° C. and 29.5 parts by weight of pyridine was added thereto. The reaction mixture was then heated to 60° C. for 2 hours, cooled, washed with a 1 N sodium hydroxide aqueous solution, a 1 N hydrochloric acid solution and water, and vacuum-flashed at 100° C. and 1 to 5 mm. Hg absolute. The resulting ester was decolorized by heating with charcoal, filtered and then flash-distilled at 157 to 164° C. and 1 mm. Hg absolute to evolve 205 parts by weight of product. The yield was 41% based upon the amount of resorcinol charged.

Example VI

Bisphenol A (diphenol, dimethyl methane) dineoheptanoate was prepared by azeotroping 342 parts by weight (1.5 moles) of bisphenol A with 440 parts by weight of benzene at 65 to 80° C. until no more water was removed. The thus dried mixture was cooled and 14.2 parts by weight of dimethyl formamide catalyst was added thereto followed by the slow addition (1 hour) of 490 parts by weight (3.3 moles) of neoheptanoyl chloride. The reactants were refluxed for 1 hour at 120° C. and the resultant product was stripped of volatiles by heating to 280° C. at 4 mm. Hg absolute until no more volatiles were collected. The residue of the volatile stripping step was washed 5 times with 1 N sodium hydroxide aqueous solution at 40 to 50° C. and water-washed to neutrality. The oil layer from the water wash was dehydrated in vacuo, decolorized with charcoal, and filtered to evolve 520 parts by weight of bisphenol A dineoheptanoate product which was a dark yellow oil more viscous than n-heptanoate, which did not tend to crystallize. The yield was 76.6% based upon the amount of bisphenol A charged.

Example VII

Resorcinol dineodecanoate was prepared by mixing 127 parts by weight (1.15 moles) of resorcinol, 400 parts by weight of toluene solvent, and 14.2 parts by weight of dimethylformamide catalyst. This solution was heated to 65° C. and 432 parts by weight (2.27 moles) of neodecanoyl chloride was slowly added thereto in 1.5 hours. The reaction mixture, which raised in temperature to 75° C. during the acid chloride addition, was heated to 90° C. and refluxed, after the acid chloride addition was completed, until hydrogen chloride ceased to be evolved. After reflux, the mixture was cooled to 40° C. and 49 parts by weight of pyridine was added thereto. The mixture was then reheated to 75° C. for 30 minutes, cooled, and washed with 1 N sodium hydroxide aqueous solution, 1 N hydrochloric acid solution and water. The washed reaction product was vacuum-flashed at 100° C. and 1 to 5 mm. Hg absolute, decolorized with charcoal, and vacuumm-filtered to evolve 375 parts by weight of product which was a pale orange liquid. The yield was 78% based upon the amount of resorcinol charged.

Example VIII

Resorcinol dineotridecanoate was prepared by mixing 137 parts by weight (1.25 moles) of resorcinol, 400 parts by weight of toluene solvent, and 14.2 parts by weight of dimethyl formamide catalyst. This solution was heated to 70° C. and 580 parts by weight (2.5 moles) of neotridecanoyl chloride was slowly added thereto in 1.5 hours. The reaction mixture was maintained at 70° C. for 2 hours until hydrogen chloride was no longer evolved whereupon the reaction mixture was cooled to 40° C. and 49 parts by weight of pyridine was added thereto. The resulting mixture was stirred for 1 hour at 40 to 50° C., washed with a 1 N hydrochloric acid solution, a 1 N sodium hydroxide solution and then water; vacuum flashed at 100° C. and 1 to 5 mm. Hg absolute; decolorized with charcoal, and vacuum-filtered to evolve 500 parts by weight of product which was a colorless liquid. The yield was 80% based upon the amount of resorcinol charged.

Example IX

Resorcinol benzoate neoheptanoate was prepared by mixing 165 parts by weight (1.5 moles) of resorcinol, 300 parts by weight of toluene solvent, and 4.7 parts by weight of dimethylformamide catalyst. This solution was reacted with 211 parts by weight (1.5 moles) benzoyl chloride and 234 parts by weight (1.5 moles) of neoheptanoyl chloride by slowly adding the two chlorides simultaneously to the solution in 2 hours at 70° C.

The reaction was maintained at 70° C. for 2 hours until hydrogen chloride was no longer evolved whereupon the reaction mixture was cooled to 40° C. and 49 parts by weight of pyridine was added thereto. The resulting mixture was stirred for two hours at 60° C., cooled to 40° C., and washed with 1 N hydrochloric acid, 1 N sodium hydroxide solution and water. The washed reaction product was vacuum-flashed at 100° C. and 1 to 5 mm. Hg absolute to remove the solvent, decolorized with charcoal, and vacuum-filtered to evolve 369 parts by weight of product which was then flashed to a colorless liquid. The yield was 75% based upon the amount of resorcinol charged. The product was a mixture of esters (resorcinol benzoate neoheptanoate, resorcinol dibenzoate, and resorcinyl dineoheptanoate).

Example X

Bisphenol A (diphenol, dimethyl methane) dibenzoate was prepared by azeotroping 342 parts by weight (1.5 moles) of bisphenol A with 908 parts by weight of toluene solvent at 65 to 80° C. until dry, whereupon the solution was cooled to 30° C. and 261 parts by weight (3.3 moles) of pyridine was added thereto. Then 464 parts by weight (3.3 moles) of benzoyl chloride was slowly added while maintaining the mixture temperature at 30 to 40° C. to form a thick slurry, which slurry was heated 90 to 100° C. for 1 hour, cooled to 30° C. and then water-washed. The ester product crystallized out in the cooling step and was removed from the running reaction mixture by filtration. The filtered material was slurried in 1 N hydrochloric acid, filtered, and recrystallized twice from toluene to evolve 445 parts by weight of product which was a colorless crystalline powder. The yield was 67% based upon the amount of bisphenol A charged.

Example XI

Resorcinol dibenzoate was prepared by mixing 165 grams (1.5 moles) of resorcinol, 454 parts by weight of toluene solvent, and 14.2 parts by weight of dimethylformamide catalyst. The solution was heated to 65° C. and 464 parts by weight (3.3 moles) of benzoyl chloride was slowly added thereto (over the period of 1 hour). The reaction temperature was slowly raised to 80° C. and then the reactants were refluxed for 2 hours at 85° C. until hydrogen chloride ceased to be evolved after which time 1.9 parts by weight of pyridine was added and the mixture refluxed for an additional 3 hours at 120° C. The reaction products were cooled to 30° C., washed with 1 N sodium hydroxide solution, 1 N hydrochloric acid and water; vacuum-flashed at 100° C. and 1 to 5 mm. Hg absolute to remove solvent until the ester product began to crystallize out of solution, then reheated to 70° C. to re-dissolve the ester, decolorized with charcoal, and then cooled to crystallize the product which was white crystalline needles. The yield was 85% based upon the amount of resorcinol charged.

Example XII

Hydroquinone dibenzoate was prepared by mixing 165 parts by weight (1.5 moles) of hydroquinane, 454 parts by weight of toluene solvent, and 20 parts by weight of dimethylformamide catalyst. Benzoyl chloride was slowly added to this solution, 464 parts by weight (3.3 moles) in 2 hours, at 70° C. The reaction mixture was refluxed at 100° C. for 2 hours and then cooled to 40° C., 19 parts by weight of pyridine was added thereto, and the mixture then refluxed for 3 additional hours. The ester reaction product precipitated directly from the reaction mixture and was recovered by filtration. Recrystallization of the ester from hot dioxane evolved 310 parts by weight of product which was white. The yield was 97% based upon the amount of hydroquinone charged.

Example XIII 3,4' dihydroxyphenyl (bisphenol) ether neoheptanoate was prepared by mixing 76 parts by weight (0.38 mole) of 3,4' dihydroxyphenyl ether, 2.7 parts by weight of dimethylformamide catalyst and 433 parts by weight of toluene solvent. The mixture was heated to 80° C. and 125 parts by weight (0.84 mole) of neoheptanoyl chloride was slowly added thereto over a period of 30 minutes while the temperature was maintained between 80° C. and 90° C. The reaction was allowed to proceed at this temperature for 3 hours until evolution of hydrogen chloride gas ceased whereupon the reaction mixture was stirred for 1 hour at 90° C. then washed with 1 N hydrochloric acid and fresh water. The reaction product was vacuum-flashed at 188 to 195° C. and 0.07 mm. Hg absolute to evolve 137 parts by weight of product which was a light yellow mobile oil with a boiling-point range of 188–195° C. at 0.07 mm. Hg absolute. The yield was 73% based upon the amount of 3,4' dihydroxyphenyl ether charged.

Example XIV m-(p-Octyl phenoxy) phenyl neoheptanoate was prepared by dissolving 125 parts by weight (0.42 mole) of octyl phenoxy phenol in 410 parts by weight of toluene; adding 79 parts by weight of pyridine to the solution; slowly adding (dropwise) 62 parts by weight (0.42 mole) of neoheptanoyl chloride; stirring for 1 hour at 30° C.;

permitting the mixture to stand overnight; heating for 2 hours at 95° C.; and cooling to 30° C. The reaction product was washed with water and 1 N hydrochloric acid; stripped of solvent and distilled to give 88 parts by weight of product. The yield was 51%.

Example XV p-(p-t-Butylphenoxy)phenyl neoheptanoate was prepared by dissolving 190 parts by weight (0.79 mole) of p(p-t-butylphenoxy) phenol and 2.83 parts by weight of dimethyl formamide catalyst in 600 parts by weight of toluene; slowly adding (dropwise) 129 parts by weight (0.87 mole) of neoheptanoyl chloride at 70 to 80° C.; maintaining this temperature until hydrogen chloride ceased to be evolved; cooling to 30° C.; and adding 49 parts by weight of pyridine. The reaction product was permitted to stand overnight; washed with water; and then flash-distilled at 166 to 174° C. at 0.3 mm. Hg absolute to give 202 parts by weight of product. The yield was 72% based upon the amount of p-(p-t-butylphenoxy) phenol charged.

Example XVI

Trimethylolanisole triacetate was prepared by reacting 780 parts by weight of a 70% aqueous solution (3 moles) of trimethylolphenol with 136 parts by weight (3.3 moles) of sodium hydroxide in 1430 parts by weight of methanol below 30° C. to form the phenoxide; methylating the phenoxide with 420 parts by weight (3.3 moles) of dimethylsulfate; stirring the methylation mixture for 16 hours at room temperature; adding 60 milliliters of concentrated ammonium hydroxide aqueous solution; stirring for an additional hour; fiiltering; vacuum-stripping free of water and methanol; and acetylating with 1329 parts by weight of pyridine and 1722 parts by weight (16.8 moles) of acetic anhydride at 35° C. The reaction mixture was heated to 100° C. for 1 hour; diluted with toluene; and washed with water, dilute hydrochloric acid and dilute sodium carbonate. The ester product was stripped of volatiles by flashing at 1 mm. Hg absolute and 285° C. to give 472 parts by weight of product. The yield was 48.5%.

Example XVII

Dodecylphenyl heptanoate was prepared by dissolving 393 parts by weight (1.5 moles) of dodecylphenol and 14.2 parts by weight of dimethylformamide catalyst in 440 parts by weight of benzene; slowly adding 421 parts by weight (1.7 moles) of neotridecanoyl chloride; refluxing at 70 to 75° C. for 1 hour; and adding 49 parts by weight of pyridine. The ester product was washed with dilute hydrochloric acid, dilute sodium hydroxide, and filtered to give 488.5 parts by weight of product.

Example XIX

Dixylenyl succinate was prepared by azeotroping 866 parts by weight (7.09 moles) of xylenol with 440 parts by weight of benzene; adding 78.4 parts by weight of dimethylformamide catalyst; slowly adding 506.4 (3.27 moles) of succinylchloride at 70 to 80° C. for 1 hour; and adding 147 parts by weight of pyridine at 80° C. The ester product was washed with water, dilute hydrochloric acid and dilute sodium hydroxide; stripped free of volatiles; flashed at 245 to 247° C. pot temperature and 230 to 234° C. vapor temperature at 1 mm. Hg absolute; dehydrated; decolorized with charcoal; and filtered to give 823 parts by weight of product. The yield was 77.5%.

Example XX

Dixylenyl azelate was prepared by azeotroping 590 parts by weight (4.8 moles) of xylenol with 440 parts by weight of benzene until dry; slowly adding a solution of 478 parts by weight (2.12 moles) of azelyl chloride in 220 parts by weight of benzene and 28.4 parts by weight of dimethylformamide catalyst at 90° C.; heating at 120° C. for 2 hours; and adding 147 parts by weight of pyridine at 70° C. The reaction product was washed with water, dilute hydrochloric acid and dilute caustic; vacuum-flashed at 260 to 270° C. pot temperature and 250 to 260° C. vapor temperature at 1 mm. Hg absolute; dehydrated; decolorized with charcoal; and filtered to give 656 parts by weight of product. The yield was 78%.

Example XXI

Dixylenyl sebacate was prepared by azeotroping 562 parts by weight (4.61 moles) of xylenol with 440 parts by weight of benzene until dry; adding 19 parts by weight of dimethyl formamide catalyst; slowly adding 500 parts by weight (2.09 moles) of sebacyl chloride at 70 to 80° C.; heating to 120° C. for 1 hour; adding 98 parts by weight of pyridine; and heating to 70° C. for 2 hours. The ester product was washed with water, dilute hydrochloric acid and dilute sodium hydroxide; stripped free of volatiles; flashed at 280 to 285° C. pot temperature and 264 to 267° C. vapor temperature at 1 mm. Hg absolute; dehydrated; decolorized with charcoal; and filtered to give 692 parts by weight of product. The yield was 80.8%.

Example XXII

Trimethylolanisole tribenzoate was prepared by saponifying 123 parts by weight (0.38 mole) of trimethylolanisole triacetate with 52 parts by weight (1.3 moles) of sodium hydroxide in 550 parts by weight of methanol by refluxing for 9 hours; neutralizing the product with glacial acetic acid; vacuum-stripping and adding dioxane until the methanol was removed; chilling to provide trimethylanisole; and adding 490 parts by weight of dry pyridine and 168 parts by weight (1.2 moles) of benzoyl chloride. The reaction product was washed with water, dilute hydrochloric acid and dilute sodium carbonate; decolorized with charcoal; and filtered to give 173 parts by weight of product.

Example XXIII p-(p-t-Octylphenoxy)phenol, 191 parts by weight (0.64 mole), one liter of toluene, and three ml. of dimethylformamide were charged to a two-liter, three-neck flask, and the mixture was heated to 80° C. Neoheptanoyl chloride, 105 parts by weight (0.74 mole), was placed in a dropping funnel and added slowly to the reactor. After complete addition of the acid chloride, the mixture was stirred at 88° C. for one hour, then cooled to 25° C. and 80 ml. of pyridine was added. The solution was heated to 90° C., stirred at this temperature for three hours, then allowed to stand overnight. It was washed with one liter of water, twice with dilute hydrochloric acid, three times with 20% sodium hydroxide and finally with water. The solvent was stripped off under vacuum, then the product was distilled to give 127 parts by weight (48.5% yield) of a clear oil boiling over a range of 187–192° C. at 0.1 mm. HgA.

Example XXIV m-(p-t-Octylphenoxy)phenol, 125 parts by weight (0.42 mole), and one pint of toluene were placed in a one-liter, three-neck flask fitted with reflux condenser and dropping funnel. Pyridine, 80 ml., was added to the solution and neoheptanoyl chloride, 62 parts by weight (0.42 mole), was added dropwise. This mixture was stirred for one hour at 30° C. following the complete addition of the acid chloride, and then allowed to stand overnight. The product was heated to 95° C. for two hours, cooled to 30° C. and then washed with water and dilute hydrochloric acid. It was then stripped of solvent and vacuum distilled. The boiling point was 182–196° C. at 0.5 mm. HgA, with a yield of 88 parts by weight (51%).

Example XXV p-(m-Phenoxyphenoxy)phenol, 153 parts by weight (0.55 mole), 450 parts by weight of toluene and three ml.

of dimethylformamide were placed in a one-liter, three-neck flask. Water was removed by azeotropic distillation. The addition of neoheptanoyl chloride, 90 parts by weight (0.61 mole), was begun at 70° C. Approximately 30 parts by weight was added at this temperature and when no reaction was observed, the temperature was gradually increased until the reaction began (90° C.). The remainder of the acid chloride was added slowly at this temperature. The mixture was stirred for 45 minutes, cooled to 40° C. and 50 ml. of pyridine was added. The solution was allowed to stand overnight, heated with stirring at 70° C. for one hour, then washed twice with dilute hydrochloric acid, four times with dilute sodium hydroxide, and finally with water to neutrality. Flash distillation gave 134 parts by weight (62% yield) of a mobile oil, B.P. 212° C. at 0.5 mm. HgA.

Example XXVI 3,4'-dihydroxydiphenyl ether, 76 parts by weight (0.38 mole), three ml. of dimethylformamide, and 500 ml. of toluene were placed in the reactor and heated to 80° C. Neoheptanoyl chloride, 125 parts by weight (0.84 mole), was added slowly over a period of 30 minutes with the temperature kept at 80–90° C. When the evolution of hydrogen chloride gas ceased, the solution was cooled to 30° C. and 80 ml. of pyridine was added slowly. The mixture was then stirred at 90° C. for one hour, then washed with dilute hydrochloric acid and water. Distillation gave 137 parts by weight (73% yield) of a light yellow, mobile oil having a boiling range of 188–195° C. at <0.1 mm. HgA.

Example XXVII 4,4'-dihydroxydiphenyl ether, 100 parts by weight (0.5 mole), was placed together with 500 ml. of toluene and three ml. of dimethylformamide in a one-liter, three-neck flask fitted with stirrer, modified Dean-Stark trap, reflux water condenser, dropping funnel, and hydrogen chloride gas trap. Residual water was removed by azeotropic distillation. Neoheptanoyl chloride, 162 parts by weight (1.09 moles), was placed in the dropping funnel and added slowly to the reactor at 85–90° C. When all the neoheptanoyl chloride had been added and evolution of hydrogen chloride gas had ceased, the product was cooled to room temperature and 80 ml. of pyridine was added. The mixture was heated to 80–90° C. for three hours, then allowed to stand overnight.

The product was washed with dilute hydrochloric acid, 20% sodium hydroxide, and finally with water, stripped of solvent under vacuum, and treated with decolorizing carbon. Vacuum flash distillation gave 136 parts by weight (64% yield) of colorless material, B.P. 199–202° C. at 0.1 mm. HgA.

Example XXVIII

Resorcinol, 24 parts by weight (0.22 mole), 100 ml. of benzene, and two ml. of dimethylformamide were placed in a 500 ml., three-neck, round-bottom flask equipped with a dropping funnel, stirrer and hydrogen chloride gas trap. This solution was heated to 70° C. and crude neooctanoyl chloride was added slowly at 70–80° C. When the evolution of hydrogen chloride gas ceased, the mixture was cooled, 20 ml. of pyridine was added and the solution was allowed to stand overnight. This product was then washed with water, dilute hydrochloric acid, and dilute sodium hydroxide and the solvent was removed in vacuo. Distillation of the resulting oil gave 52 parts by weight (60% yield) of product boiling in the range 155–172° C. at 0.3 mm. HgA.

Example XXIX

Resorcinol, 34 parts by weight (0.31 mole), three ml. of dimethylformamide, and 350 parts by weight of toluene were charged to the reactor flask and heated to 75° C. 2,2,4,4-tetramethylphentanoyl chloride, 115 parts by weight (0.65 mole), was then added slowly from a dropping funnel. The reaction began at approximately 90° C. and a temperature of 90–95° C. was maintained during the addition of the acid chloride. After evolution of HCl had ceased, the product was stirred for an additional two hours at 95° C., then cooled to 25° C. and 80 ml. of pyridine was added. The solution was then heated to 100–110° C. and stirred at this temperature for 90 minutes, and allowed to stand overnight. The product was washed twice with one liter of dilute hydrochloric acid, three times with one liter of 20% sodium hydroxide, and finally with water until neutral. Flash distillation gave 45 parts by weight (37.2% yield) of product, boiling in the range of 153–163° C. at 0.15 mm. HgA.

Example XXX

Resorcinol, 330 parts by weight (3 moles), two liters of toluene and five ml. of dimethylformamide were placed in a five-liter, three-neck flask and heated with stirring to 75° C. 2-methyl-2-ethylhexanoyl chloride, 1165 parts by weight, (6.6 moles), was added slowly from a dropping funnel. The temperature was maintained at 75–85° C. during the addition of the acid chloride. After refluxing the mixture for two hours, it was cooled to 65° C. and 100 ml. of pyridine was added. The solution was stirred for six hours and then washed with dilute hydrochloric acid, dilute sodium hydroxide, and finally with water. Solvent was stripped under vacuum and the ester was distilled. Boiling point ranged from 188–204° C.; the wide range was due to difficulty experienced in maintaining a uniform pressure. The pressure varied from 0.1–2.0 mm. HgA. A yield of 1050 parts by weight (78% of theory) of a water white oil was obtained.

Example XXXI p-t-Butylphenol, 475 parts by weight (3.17 moles), 500 ml. of toluene, and three ml. of dimethylformamide were placed in a two-liter, three-neck flask and water was removed from the phenol by azeotropic distillation.

Adipoyl chloride, 264 parts by weight (1.44 moles), was added slowly to the reactor at 70–75° C. Following complete addition of the acid chloride, the reaction mixture was stirred at 75° C. for one hour, then cooled to 50° C. and 100 ml. of pyridine was added. After stirring the solution for two hours, it was washed twice with dilute hydrochloric acid, twice in hot (60° C.) dilute sodium hydroxide, and twice with hot water. The ester was allowed to crystallize overnight, vacuum filtered, then recrystallized once from heptane to give 330 parts by weight (59% yield) of a white crystalline solid.

Example XXXII p-t-Butylphenol, 384 parts by weight (2.56 moles), 600 ml. of toluene, and three ml. of dimethylformamide were charged to the reactor flask and heated with stirring to 70° C. Azelaoyl chloride, 250 parts by weight (1.11 moles), was added cautiously from a dropping funnel. The reaction was vigorous and instantaneous. After complete addition of the acid chloride, the mixture was stirred at 70° C. for two hours, then cooled to 55° C. and 100 ml. of pyridine was added. After stirring the solution for one hour, it was washed twice with dilute hydrochloric acid, three times with dilute sodium hydroxide, and twice with water, then allowed to crystallize. It was then vacuum filtered and dried to give 320 parts by weight (62% yield) of crude product.

Example XXXIII p-t-Butylphenol, 276 parts by weight (1.84 moles), 600 parts by weight of toluene, and three ml. of dimethylformamide were placed in a two-liter, three-neck flask and heated with stirring. Sebacoyl chloride, 200 parts by weight (0.84 mole), was added slowly from a dropping funnel when the reactor temperature reached 60° C. A temperature of 60–65° C. was maintained during the time of addition (25 minutes). The solution was stirred for three hours at 70-80° C., then cooled to 55° C. and 100 ml. of pyridine was added. The mixture was stirred for one hour, then allowed to stand overnight. The crude product was washed twice with dilute hydrochloric acid, five times with dilute sodium hydroxide, and three times with water, then allowed to crystallize overnight. Vacuum filtration gave 366 parts by weight (94% of theory) of crude ester which was recrystallized twice from heptane to give 150 parts by weight of pure product.

Example XXXIV m-t-Butylphenol, 475 parts by weight (3.17 moles), and 600 parts by weight of toluene were placed in a two-liter, three-neck flask fitted with stirrer, condenser, hydrogen chloride gas trap, and Dean-Stark trap. Water was removed by azeotropic distillation. The mixture was then cooled to 75° C., three ml. of dimethylformamide was added and the addition of adipoyl chloride, 264 parts by weight (1.44 moles), was begun. The acid chloride was added to the reactor dropwise over a period of 30 minutes with the temperature kept at 75 to 80° C. The mixture was stirred at 77 to 80° C. for one hour then cooled to 50° C. and 80 ml. of pyridine was added cautiously. The solution was then stirred for one hour, washed twice with dilute hydrochloric acid, four times with dilute sodium hydroxide and finally with water until neutral to litmus. Approximately 400 ml. of solvent was flashed off under vacuum, and the product was allowed to crystallize overnight. The product, after dehydration, consisted of fluffy white crystals; 450 parts by weight was obtained, a yield of 76%.

Example XXXV di-t-Pentylphenol, 515 parts by weight (2.2 moles), 500 parts by weight of toluene, and three ml. of dimethylformamide were added to a two-liter, three-neck flask. The mixture was heated with stirring to 60° C. and adipoyl chloride, 183 parts by weight (one mole), was added dropwise over a period of one hour. The mixture was heated with stirring to 80° C. for two hours, then cooled to 60° C. and 100 ml. of pyridine was added to catalyze completion of the reaction. The crude product was washed twice with dilute hydrochloric acid, five times with hot (60° C.), dilute sodium hydroxide and finally with water to neutrality. Solvent was stripped under vacuum; the product was treated with decolorizing carbon and then vacuum filtered to give 518 parts by weight (80% yield) of a viscous, yellow oil.

Example XXXVI

Nonylphenol, 215 parts by weight (0.98 mole), was placed in a two-liter flask with 600 ml. of toluene and three ml. of dimethylformamide. Adipoyl chloride, 82 parts by weight (0.45 mole), was added slowly to the flask at 65-70° C. The solution was heated with stirring to 70-80° C. for three hours, then cooled to 55° C. and 100 ml. of pyridine was added. The mixture was allowed to stand overnight. The crude product was washed twice with dilute hydrochloric acid, five times with hot, dilute sodium hydroxide and twice with water. Solvent was flashed in vacuo, and the product was treated with decolorizing carbon. Vacuum filtration gave 200 parts by weight (83% of theory) of a viscous yellow liquid.

The term "parts by weight" refers to grams.

Table I, below, is a listing of the physical properties of some representative esters synthesized according to this invention.

TABLE I

| Ester | M.P. (° C.) | Pour point (° F.) | Acid No. (mg. KoH/gm.) | Viscosity at 450° F. (cs.) | Wt. percent OH |
|---|---|---|---|---|---|
| Resorcinal diheptanoate | 1.5 | | 0.6 | 0.76 | 0.4 |
| Hydroquinone diheptanoate | 56.6-60.4 | | 0.1 | 0.87 | 0.6 |
| Bisphenol A diheptanoate | 29-32.4 | | 0.6 | 1.40 | 0.1 |
| Resorcinol dineoheptanoate | | −55 | 0.1 | 1.73 | 0.1 |
| Bisphenol A dineoheptanoate | | 10 | 0.1 | 1.7 | 0.5 |
| Resorcinal dineodecanoate | | −9 | 0.2 | 1.0 | 0.2 |
| Resorcinol dineotridecanoate | | 1 | 0.1 | 1.3 | 0.1 |
| Resorcinal dipivalate | 765-77.8 | | 0.0 | 0.71 | |
| Bisphenol A dibenzoate | 161.0-162.3 | | 0.1 | 2.7 | 0.1 |
| Hydroquinone dibenzoate | 205-208 | | 0.4 | 1.3 | 0.1 |
| 3,4′ bisphenol ether dineoheptanoate | | 10 | 0.1 | 1.2 | 0.77 |
| Resorcinal dibenzoate | 116.8-117.4 | | 0.3 | 1.2 | 0.6 |
| P-(p-t-butylphenoxy)phenyl neoheptanoate | | 3 | 0.35 | 1.02 | 0.49 |
| M-(p-octylphenoxy)phenyl neoheptanoate | | 28 | 0.1 | 1.2 | N.T. |
| P-(p-t-pentylphenoxy)phenyl neoheptanoate | | −3.5 | N.T. | 1.06 | N.T. |
| P-(p-t-pentylphenoxy)phenyl neopentanoate | | 23 | N.T. | 1.0 | N.T. |
| P-(m-t-butyl-phenoxy)phenyl neoheptanoate | | 1 | N.T. | 0.94 | N.T. |
| P-(m-t-butyl-phenoxy)phenyl neopentanoate | 82.5-92.5 | | N.T. | 0.82 | N.T. |

N.T.=Not tested.

Gas turbine engines are a most important source of power today. Turboprop and turbojet engines are in service with both the military and commercial aviation interests and gas turbine engines are starting to become commercial power for boats and cars. As is well known, a turbine consists of a shaft having blades or buckets spaced therearound. A high-temperature fluid under high pressure is directed against the blades or buckets usually parallel to the axis of the shaft, and the energy of the fluid is transferred to the turbine thus causing the shaft to rotate and permitting it to do work. Gas turbines operate effectively at about 500 to 1000° C. with bearing temperatures preferably about 525° F. to 600° F. Lubricants for such turbines are subjected, in use, to temperatures in this range.

Turbine engines are lubricated from a central lubricant supply. The lubricant is fogged into the bearing chamber, in a so-called mist application, to lubricate the ball or roller bearings of the turbine. The lubricant also performs the important function of cooling the graphite seals between the turbine blades and the combustion chamber. After lubricating the roller or ball bearings, the lubricant is collected in sumps from which it is pumped back to the lubricant supply. The lubricant is degassed before being recirculated by centrifuging to remove any gas or volatiles (cracked lubricant molecules primarily) which have been introduced to the system. This same lubricant is also used to lubricate the drive gears for auxiliary power chains driven by the turbine. In the case of jet engines, these auxiliary drive chains can operate a compressor, air-conditioning units, guidance systems, weapons systems, and the like. The lubricant is operable in the mesh of the gears and therefore must withstand extremely high pressures. It is also very important that the lubricant must be temperature and oxidative stable in order to withstand the conditions encountered in turbine lubrication applications.

Esters made according to this invention were tested to determine their thermal stability and their oxidation stability. The thermal stability test was conducted by placing 25 grams of the ester under test in a tube with a nitrogen atmosphere, subjecting the tube and contents to high temperatures (650° C., 700° F., and 750° F.) for 9 hours, and then testing the ester to determine its physical properties. Table II below is a compilation of data taken from these tests.

it to a dry air flow of 1.2 liters per hour for 6 hours at various temperatures (347° F. and 450° F.) after which time the esters were tested to determine their physical properties. Table III below is a compilation of data taken from these tests.

TABLE III

| Ester | Acid No. | | Wt. % OH | | Viscosity at 450° F. (cs.) | |
|---|---|---|---|---|---|---|
| | 347° F. | 450° F. | 347° F. | 450° F. | 347° F. | 450° F. |
| Resorcinol dipivalate | N.T. | 1.7 | N.T. | 0.3 | N.T. | 0.71 |
| Resorcinol diheptanoate | 14 | N.T. | 0.5 | N.T. | 0.76 | N.T. |
| Hydroquinone diheptanoate | 6.3 | N.T. | 0.2 | N.T. | 0.85 | N.T. |
| Bisphenol A diheptanoate | 0.3 | 16 | 0.1 | 0.8 | 1.4 | 1.1 |
| Resorcinol dineoheptanoate | N.T. | 0.4 | N.T. | 0.2 | N.T. | 0.77 |
| Bisphenol A dineoheptanoate | 0.1 | 0.6 | 0.3 | 0.2 | 1.7 | 1.9 |
| Resorcinol neodecanoate | N.T. | 20 | N.T. | 0.9 | N.T. | 2.8 |
| Resorcinol neotridecanoate | N.T. | 7.9 | N.T. | 0.7 | N.T. | 1.6 |
| Bisphenol A dibenzoate | 0.9 | 1.7 | 0.2 | 0.3 | 2.7 | 2.7 |
| Resorcinol dibenzoate | 8.2 | 3.9 | 0.3 | 0.4 | 1.1 | 1.2 |
| Hydroquinone dibenzoate | N.T. | 7.9 | N.T. | 0.3 | N.T. | 1.3 |
| 3,4' bisphenol ether dineoheptanoate | [1] N.T. | 0.8 | N.T. | 1.0 | N.T. | [2] 169 |

[1] 475° F., 29 hrs.
[2] 210° F.
N.T.=Not tested.

It is to be understood that the foregoing detailed description is given merely by way of illustration and that many variations may be made therein without departing from the spirit of our invention.

We claim:
1. Resorcinal dipivalate.
2. Resorcinal dineoheptanoate.
3. Resorcinol dineodecanoate.
4. Resorcinol dineotridecanoate.
5. Resorcinol dineooctanoate.

TABLE II

| Ester | Acid No. | | | Wt. percent OH | | | Viscosity at 450° F. (cs.) | | |
|---|---|---|---|---|---|---|---|---|---|
| | 650° F. | 700° F. | 750° F. | 650° F. | 700° F. | 750° F. | 650° F. | 700° F. | 750° F. |
| Resorcinal dipivalate | 0.3 | N.T. | 1.6 | 0.1 | N.T. | 0.2 | 0.69 | N.T. | N.T. |
| Resorcinal diheptanoate | 20 | 30 | 54 | 1.6 | 2.6 | 4.0 | 0.79 | 0.89 | 1.1 |
| Hydroquinone diheptanoate | N.T. | 7.6 | 4.5 | N.T. | 1.0 | 2.5 | N.T. | 0.86 | 1.0 |
| Bisphenol A diheptanoate | 1.0 | 5.8 | 5.3 | 0.7 | 1.6 | 1.3 | 1.4 | 1.3 | 1.2 |
| Resorcinol dineoheptanoate | 0.4 | N.T. | 0.1 | 0.1 | N.T. | 0.1 | 0.73 | N.T. | 0.77 |
| Bisphenol A dineoheptanoate | 0.2 | N.T. | 2.4 | 0.4 | N.T. | 0.5 | 1.6 | N.T. | 1.4 |
| Resorcinol dinedoecanoate | 5.7 | N.T. | 6.0 | 0.3 | N.T. | 0.8 | 1.1 | N.T. | 0.93 |
| Resorcinol dineotridecanoate | N.T. | N.T. | 2.1 | N.T. | N.T. | 0.8 | N.T. | N.T. | 1.0 |
| Bisphenol A dibenzoate | 9.6 | 2.6 | 12 | 0.5 | 0.2 | 0.5 | 2.8 | 2.5 | 2.5 |
| Resorcinol dibenzoate | 2.4 | 13 | 60 | 0.1 | 0.8 | 1.2 | 1.1 | 1.3 | 3.9 |
| Hydroquinone dibenzoate | 39 | 1 | 7.5 | 1.2 | 0.1 | 0.1 | 1.3 | 1.4 | 1.5 |
| 3,4' Bisphenol ether dineoheptanoate | N.T. | N.T. | 0.9 | N.T. | N.T. | 1.7 | N.T. | N.T. | [1] 287 |

[1] At 100° F.
N.T.=Not tested.

The oxidation stability test is conducted by placing 25 grams of the ester under test in a tube and subjecting 6. Resorcinol di-(2,2,4,4-tetramethylpentanoate).
7. Resorcinol di-(2-methyl-2-ethylhexanoate).

References Cited

UNITED STATES PATENTS

| 3,341,574 | 9/1967 | Taylor et al. | 260—485 |
| 3,205,270 | 9/1965 | Jaruzelski et al. | 260—613 |
| 2,345,006 | 3/1944 | Ross et al. | 260—410.5 |

FOREIGN PATENTS 1,175,829   4/1959   France.

OTHER REFERENCES

Ingle et al.: J. Indian Chem. Soc. vol. 26, pp. 569–74 (1949) QD 1.15j.

Cruickshank et al. J. Chem. Soc. (1938) 2064–71.

Aelony: J. Amer. Oil Chemists Soc. vol. 32, (1955), pp. 170–71.

LORRAINE A. WEINBERGER, Primary Examiner

R. S. WEISSBERG, Assistant Examiner

U.S. Cl. X.R.

260—476, 479, 613